United States Patent [19]

Barrett

[11] 4,103,515

[45] Aug. 1, 1978

[54] DRIVING MECHANISMS

[75] Inventor: Edward George Barrett, Witney, England

[73] Assignee: Smiths Industries Limited, London, England

[21] Appl. No.: 602,502

[22] Filed: Aug. 6, 1975

[51] Int. Cl.$^2$ .................. F16D 31/06; F16D 31/08
[52] U.S. Cl. ................... 64/26; 192/58 A; 192/58 B; 192/110 B
[58] Field of Search ............... 192/58 B, 58 A; 64/26; 308/DIG. 5

[56] References Cited

U.S. PATENT DOCUMENTS

| 2,680,410 | 6/1954 | Kolb | 308/DIG. 5 |
|---|---|---|---|
| 2,812,648 | 11/1957 | Croset | 64/26 |
| 3,007,560 | 11/1961 | Weir | 192/58 B |
| 3,512,622 | 5/1970 | Sutaruk | 192/58 B |
| 3,559,785 | 2/1969 | Weir | 192/58 B |
| 3,910,391 | 10/1975 | Detty et al. | 192/58 B |

Primary Examiner—Benjamin W. Wyche
Assistant Examiner—R. C. Turner
Attorney, Agent, or Firm—Pollock, Vande Sande & Priddy

[57] ABSTRACT

In a driving mechanism of the kind having a drive part and a driven part with a shear-type coupling therebetween, the drive and driven parts have respective cylindrical surfaces which are spaced apart from, and substantially coaxial with, one another to define an annular space centered on the rotational axis of the parts. A fluid is disposed in the annular space to provide, at least in part, the said shear-type fluid coupling, and the spaced cylindrical surfaces together with the fluid therebetween constitute the sole bearing for the drive part. The fluid may contain an anti-creep additive. One of the said cylindrical surfaces, preferably the inner circumferential surface, may be constituted, at least in part, by a porous member impregnated with a shear-type fluid.

12 Claims, 4 Drawing Figures

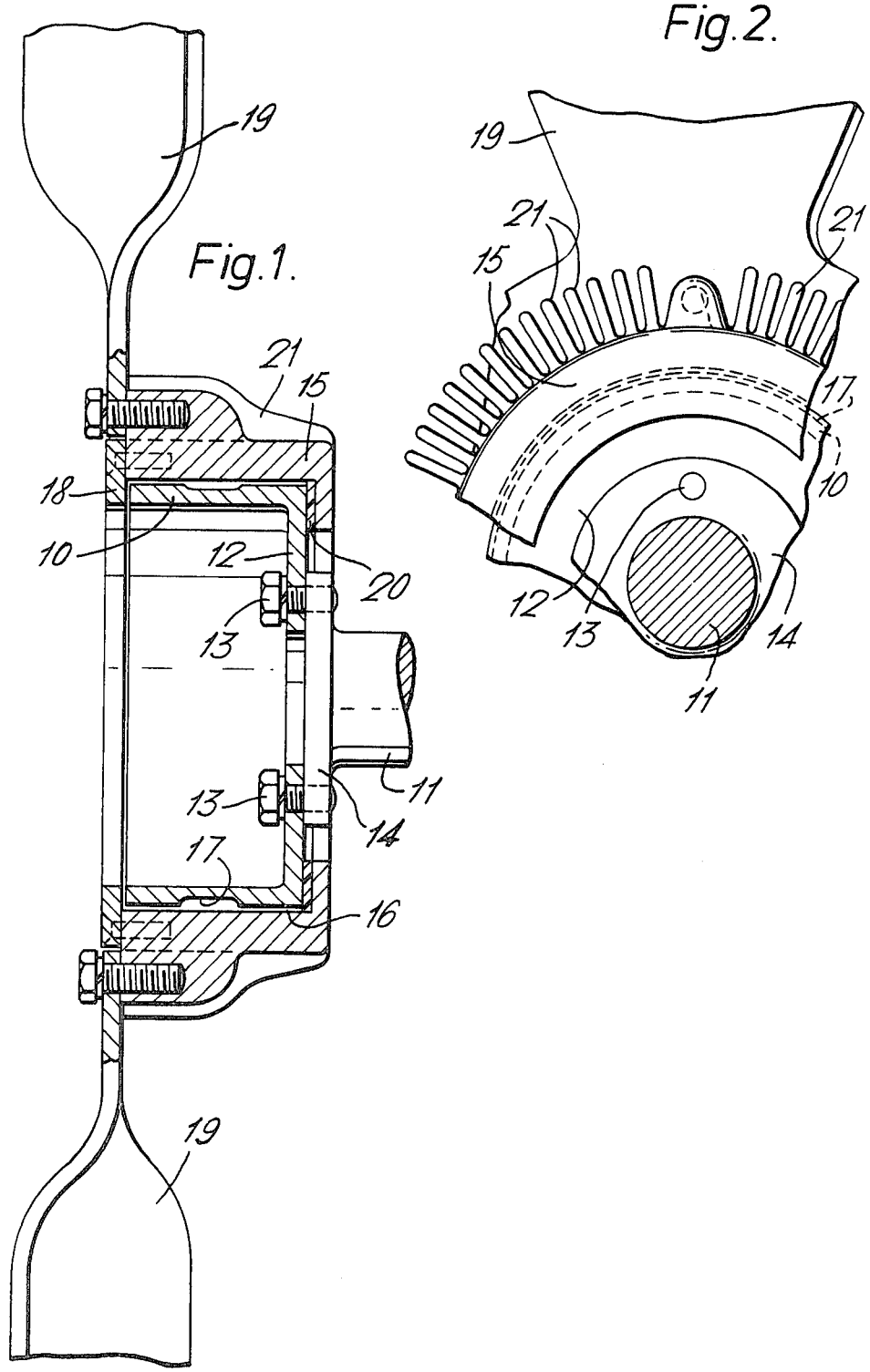

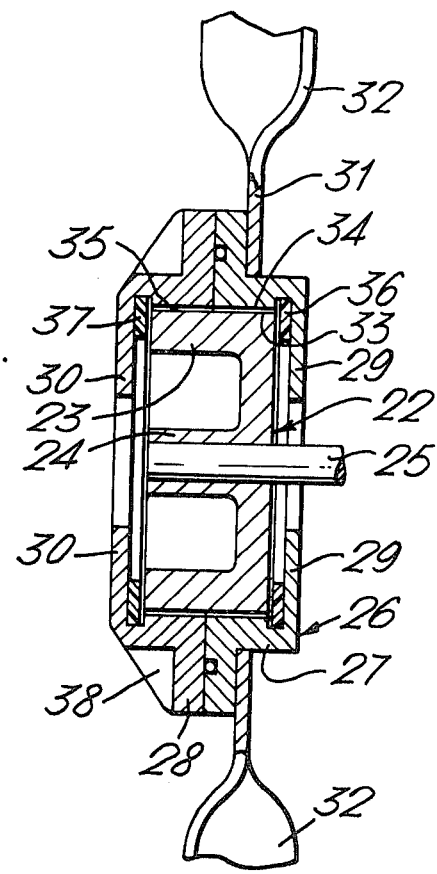
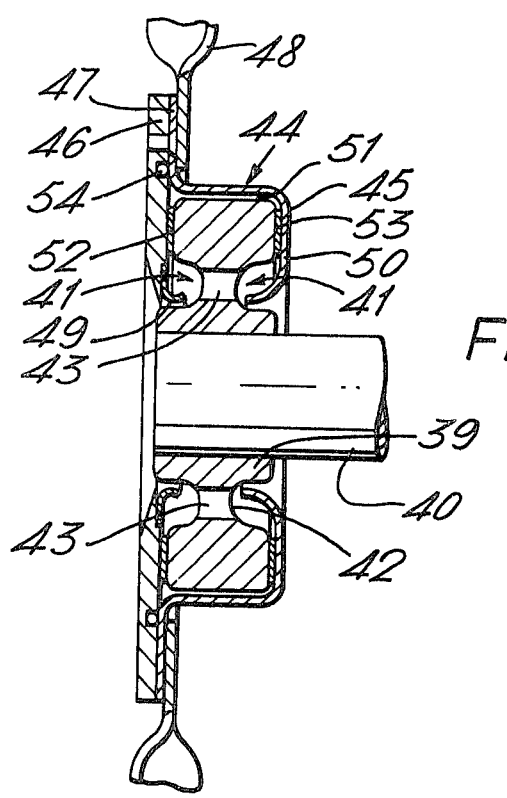

DRIVING MECHANISMS

BACKGROUND OF THE INVENTION

This invention relates to driving mechanisms.

In motor vehicles it is often required that engine cooling fans be driven at a speed which increases fairly uniformly with engine speed up to a predetermined engine speed, and which thereafter is maintained substantially constant as the engine speed increases above the said predetermined speed.

Heretofore it has been proposed that this be achieved by providing a driving mechanism having a drive part and a driven part with a shear-type fluid coupling therebetween, the shearing action of the fluid coupling being arranged to permit the required degree of slip between the parts when the engine speed is above the said predetermined speed.

SUMMARY OF THE INVENTION

One object of the present invention is to provide an improved form of such a driving mechanism for use in a motor vehicle to drive an engine cooling fan.

According to one aspect of the present invention, there is provided a driving mechanism having a drive part and a driven part with a shear-type fluid coupling therebetween, wherein the parts have respective cylindrical surfaces which are spaced apart from, and substantially coaxial with, one another to define an annular space centred on the rotational axis of the parts, there being a fluid in the annular space to provide the said shear-type fluid coupling, and wherein the said spaced coaxial surfaces together with the said fluid therebetween constitutes the sole bearing for the drive part.

The said fluid may contain an anti-creep additive, for example, carbon black.

The driven part may overlie the drive part at each end of the said annular space, and a thrust member may be disposed between the said parts adjacent at least one end of the said annular space.

One of the said cylindrical surfaces, preferably the inner cylindrical surface may be constituted, at least in part, by a porous member impregnated with a shear-type fluid. As a further alternative, the porous member may be of a sintered metal and the shear-type fluid may be a silicone fluid.

According to another aspect of the present invention, there is provided engine cooling means comprising a driving mechanism in accordance with the said first aspect of the present invention and a fan mounted on the driven part of the driving mechanism.

BRIEF DESCRIPTION OF THE DRAWINGS

Various forms of engine cooling means for a motor vehicle, and incorporating driving mechanisms in accordance with the present invention, will now be described, by way of example, with reference to the accompanying drawings in which:

FIG. 1 is a side view, partly in section, of a first form of the engine cooling means;

FIG. 2 is a fragmentary end view of the engine cooling means of FIG. 1;

FIG. 3 is a side view, partly in section, of a second form of the engine-cooling means; and FIG. 4 is a side view, partly in section, of a third form of the engine cooling means.

DETAILED DESCRIPTION OF THE PREFERRED EMBODIMENTS

Referring to FIGS. 1 and 2 of the drawings, the engine cooling means includes a drive part having a cup-shaped drive element 10 of mild steel and a water-pump drive shaft 11 to which the element 10 is coupled so that the drive member 10 is rotated at a speed which varies in accordance with engine speed. In practice, the maximum speed of the drive element 10 will be between approximately 5,000 and 7,000 rpm. One end of the drive shaft 11 extends into a hole formed in a base wall 12 of the drive element 10, and the drive element 10 is secured to the drive shaft 11 by a pair of screws 13 extending through the base wall 12 and engaging respective screw-threaded holes in a flange 14 on the drive shaft 11.

The drive element 10 is housed within a cup-shaped member 15 of a driven part, which is to be driven by the drive element 10, with the flange 14 disposed in a hole formed in the base wall of the member 15. The member 15 is driven through a shear-type fluid coupling and, to this end, the inner and outer circumferential surfaces of the driven member 15 and the drive element 10 respectively are coaxial with, and spaced from one another to define an annular space 16 for the coupling fluid that is centered on the rotational axis of the engine cooling means. The annular space 16 has a radial width of the order of five to ten thousandths of an inch. The coupling fluid is a silicone fluid and has an anti-creep additive, for example, carbon black particles, added thereto. The silicone fluid may be the fluorosilicone fluid supplied by Dow Corning International Limited and marketed under the reference FS-1265, and, in these circumstances, the carbon black may be that supplied by Cabot Carbon Limited and marketed under the trade name Monarch 71. Alternatively, the fluid may be one of the silicone fluids marketed by Dow Corning International Limited under the references 210 and 211.

An annular groove 17 is provided in the outer circumferential surface of the drive element 10 to form a reservoir for the fluid.

The drive element 10 is retained within the driven member 15 by a ring 18 of mild steel secured to the open end of the driven member 15, and this end of the driven member 15 also has secured thereto an engine cooling fan having blades 19. Thus, the member 15 overlies one end of the annular chamber 16 and the ring 18 overlies the other end of that chamber. A fluid-tight seal (not shown) is provided between the ring 18 and the driven member 15.

The characteristics of the fluid in the chamber 16 are selected so that, when the drive shaft 11 attains a speed of approximately 3,000 rpm, a shearing action takes place in the fluid coupling to permit slip between the drive element 10 and the driven member 15. Thus, when the drive shaft 11 rotates at speeds below 3,000 rpm, the speed of the driven member 15 and the engine cooling fan will vary in accordance with the rotational speed of the drive shaft and hence in accordance with the speed of the engine. At drive shaft speeds in excess of 3,000 rpm the shearing action of the fluid prevents additional torque being transmitted to the driven member 15 and thus the rotational speed of the driven member 15 will remain substantially constant irrespective of the speed of the drive element 10.

A thrust ring 20 of, for example, polytetrafluoroethylene, asbestos or rubber-bonded cork, is provided between the base walls of the drive element 10 and the driven member 15.

Axially-directed fins 21 are provided on the outer circumferential surface of the driven member 15 to cool that member and hence cool the fluid in the chamber 16. This cooling of the fluid is assisted by the generally-open form of the drive element 10.

We have found that by adding the anti-creep additive to the silicone fluid it is possible to use an open-ended chamber for the fluid. This serves to simplify considerably the construction of the driving mechanism since it is unnecessary to provide a relatively complex and expensive fluid-tight seal between the drive element 10 and the driven member 15.

Furthermore by using a generally annular shaped space for the fluid centered on the rotational axis of the engine cooling means, it has been found that the fluid in the space will also serve to provide a bearing for the drive element 10 and that it is possible to dispense with the bearing which would normally be provided for the drive shaft 11 adjacent the drive element 10.

Referring to FIG. 3, this form of the engine cooling means includes a drive part 22 having a cup-shaped portion 23 and an integral, axial sleeve 24. The sleeve 24 is coupled to one end of a water-pump drive shaft 25 so that the drive part 22 is rotated at a speed which varies in accordance with engine speed. The drive part 22 is housed within a part 26 of mild steel which is to be driven by the drive part 24 and which includes two members 27 and 28. These members 27 and 28, which are conveniently in the form of pressings, are rivetted together and have inwardly directed, annular flanges 29 and 30 which overlie respective ends of the drive part 22. An engine cooling fan 31 having blades 32 is secured to the member 27. The parts 22 and 26 have respective circumferential surfaces 33 and 34 which are spaced from, and coaxial with, one another to provide an annular space 35 having a radial width of the order of five to ten thousandths of an inch.

The drive part 22 is of a porous material and is impregnated with a silicone fluid to provide the shear-type fluid coupling between the parts 22 and 26. The part 22 is conveniently of a sintered metal such as sintered iron. When the drive part 22 is rotated, the fluid coats the circumferential surface 34 of the driven part 26 and causes a torque to be transmitted to that part until the fluid shearing action takes place. Thus, the drive part 22 comprises a reservoir for substantially all the shear-type fluid to provide the coupling between the parts 22 and 26.

Thrust rings 36 and 37 of, for example, polytetrafluorethylene are provided between the drive part 22 and the annular flanges 29 and 30, the thickness of the rings 36 and 37 being selected so as to permit a relative axial displacement between the parts 22 and 26 of the order of ten thousandths of an inch.

Radially-directed fins 38 are spaced apart around the periphery of the member 28 to cool that member and hence cool the silicone fluid.

In order to minimize the likelihood of fluid leakage from the annular space 35, the circumferential surface 33 of the drive part 22 is coated with a grease comprising silicone fluid mixed with an anti-creep additive, such as the carbon black particles referred to previously, after the part 22 has been impregnated with silicone fluid and just prior to that part 22 being mounted within the driven part 26.

Although, in this form of the engine cooling means, the whole of the circumferential surface 33 is provided by a member of porous material, it is visualised that only part of this surface need be of porous material. Furthermore, it is visualized that in certain circumstances at least part of the circumferential surface 34 may also, or, alternatively, be constituted by a member of porous material impregnated with the said fluid.

The engine cooling means shown in FIG. 4 includes a drive part 39 mounted on one end of a water-pump drive shaft 40. The drive part 39 has respective annular grooves 41 formed in its ends to define a neck portion 42, apertures 43 being formed in the neck portion 42 to provide passageways extending between the annular grooves 41. The drive part 39 is mounted within a driven part 44 comprising an annular member 45 and a ring member 46, the annular member 45 having an outwardly directed flange 47 rivetted to the ring member 46. The annular flange 47 carries the usual engine cooling fan 48.

The ring member 46 overlies one end of the drive part 39 and carries, adjacent its inner edge, an annular part 49 which projects into its respective annular groove 41. Similarly, the annular member 45 has an inwardly directed flange 50 which overlies the other end of the drive part 39 with the inner edge of that flange 50 being turned inwardly to project into the other annular groove 41.

The drive part 39 and the annular member 45 have respective circumferential surfaces which are spaced from, and coaxial with, one another to provide an annular space 51 having a radial width of the order of five to ten thousandths of an inch.

The drive part 39 and the components forming the driven part 44 are all of mild steel, the drive part 39 being porous and being impregnated with a silicone fluid to provide the shear-type fluid coupling between the parts 39 and 44 in the annular space 51.

Thrust rings 52 and 53 of, for example, rubberized cork, asbestos or rubber-bonded cork are disposed between the drive part 39 and the ring member 46, and also between the drive part 39 and the inwardly directed flange 50, the thrust rings being glued to the ring member 46 and the flange 50. A small space of the order of, say, five thousandths of an inch, is provided between each thrust ring 52 and 53 and the drive part 39, to permit relative axial displacement of the parts 39 and 44. The portions of the annular part 49 and the flange 50 that project into the grooves 41 serve to collect any fluid which leaks through the spaces between the drive part 39 and the thrust rings 52 and 53.

A fluid-tight seal 54 is provided between the ring member 46 and the outwardly directed flange 47.

In order to minimise the likelihood of fluid leakage from the annular space 51, the circumferential surface of the drive part 39 is coated with a grease comprising silicone fluid mixed with an anti-creep additive, such as the carbon black particles referred to previously, after the part 39 has been impregnated with the silicone fluid and just prior to the drive part 39 being assembled in the annular member 45.

I claim:

1. A driving mechanism comprising,
a drive part,
a driven part rotatable about a common axis with said drive part with a shear-type fluid coupling therebetween, said drive part and said driven part having respective opposing cylindrical surfaces which are spaced apart from, and substantially coaxial with, one another to define therebetween an annular space centered on said rotational axis of the parts, said drive part and said driven part together with the fluid therebetween constituting the sole bearing for the driven part, said cylindrical surfaces being formed at least in part by a member which is porous to the fluid comprising said shear-type fluid coupling, said member defining one of said opposing cylindrical surfaces, and means comprising only said porous member for storing said fluid.

2. A driving mechanism according to claim 12, wherein the driven part overlies the drive part at each end of the said annular space, and wherein a thrust member is disposed between the said parts adjacent at least one end of the annular space.

3. A driving mechanism according to claim 2, wherein the drive part comprises an annular member shaped to define an annular groove in each side thereof.

4. A driving mechanism according to claim 3, wherein said annular grooves are centered on said rotational axis.

5. A driving mechanism according to claim 4, wherein the annular member is shaped to define a plurality of apertures each extending between the said annular grooves.

6. A driving mechanism according to claim 1, wherein said porous means comprises at least part of the inner one of the cylindrical surfaces.

7. Engine cooling means comprising a driving mechanism having a drive part and a driven part rotatable about a common axis with a shear-type fluid coupling therebetween, and a fan mounted on the driven part, said drive part and said driven part having respective opposing cylindrical surfaces which are spaced apart from, and substantially coaxial with, one another to define therebetween an annular space centered on the said rotational axis of the parts, said drive part and said driven part together with the fluid therebetween constituting the sole bearing for the driven part, said cylindrical surfaces being formed at least in part by a member which is porous to the fluid comprising said shear-type fluid coupling, and means comprising only said porous member for storing said fluid.

8. A driving mechanism according to claim 1, wherein said porous means is of sintered metal.

9. A driving mechanism according to claim 1, wherein the drive part is wholly of porous material.

10. A driving mechanism according to claim 9, wherein the drive part is of sintered metal.

11. A driving mechanism according to claim 1, wherein one of the cylindrical surfaces is coated with a fluid composition which includes an anti-creep additive.

12. A driving mechanism comprising a drive part, a driven part rotatable about a common axis with said drive part, and shear-type fluid for providing a coupling between said drive and driven parts, said drive and driven parts having respective opposed surfaces which are spaced apart from, and substantially coaxial with one another to define therebetween an annular space central on said rotational axis into which said shear-type fluid is introduced upon rotation of the drive part to provide said coupling, at least one of said drive and driven parts including a member of porous material which defines one of said opposed surfaces, the said porous member being adapted to release the shear-type fluid upon said rotation of the drive part, and storage means comprising only said porous member for storing said shear-type fluid.

* * * * *